Feb. 2, 1960        H. H. SCHWARTZ        2,923,035
METHOD FOR MOLDING PLASTIC ARTICLES
Filed Aug. 3, 1956        3 Sheets-Sheet 1
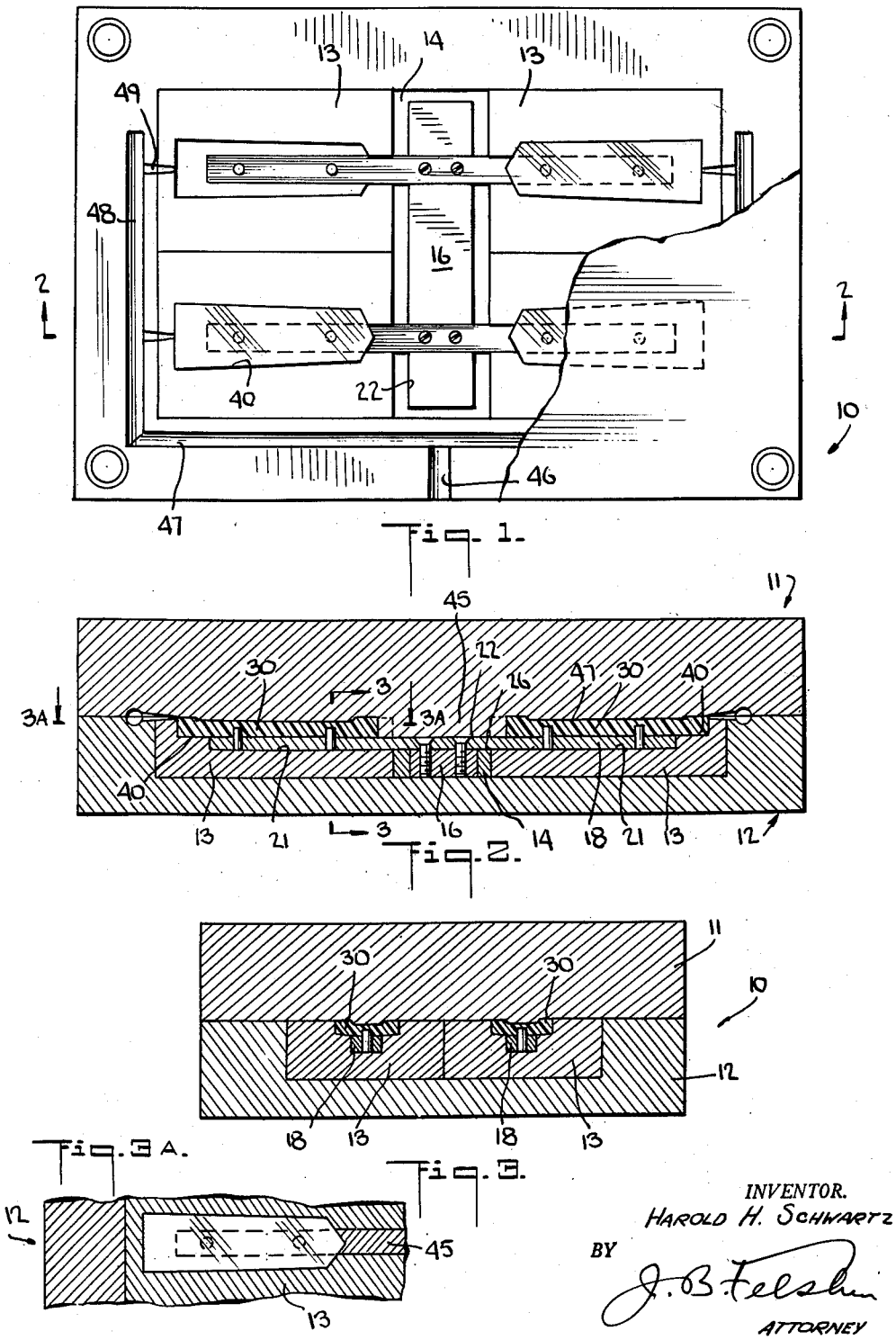
INVENTOR.
HAROLD H. SCHWARTZ
BY
ATTORNEY

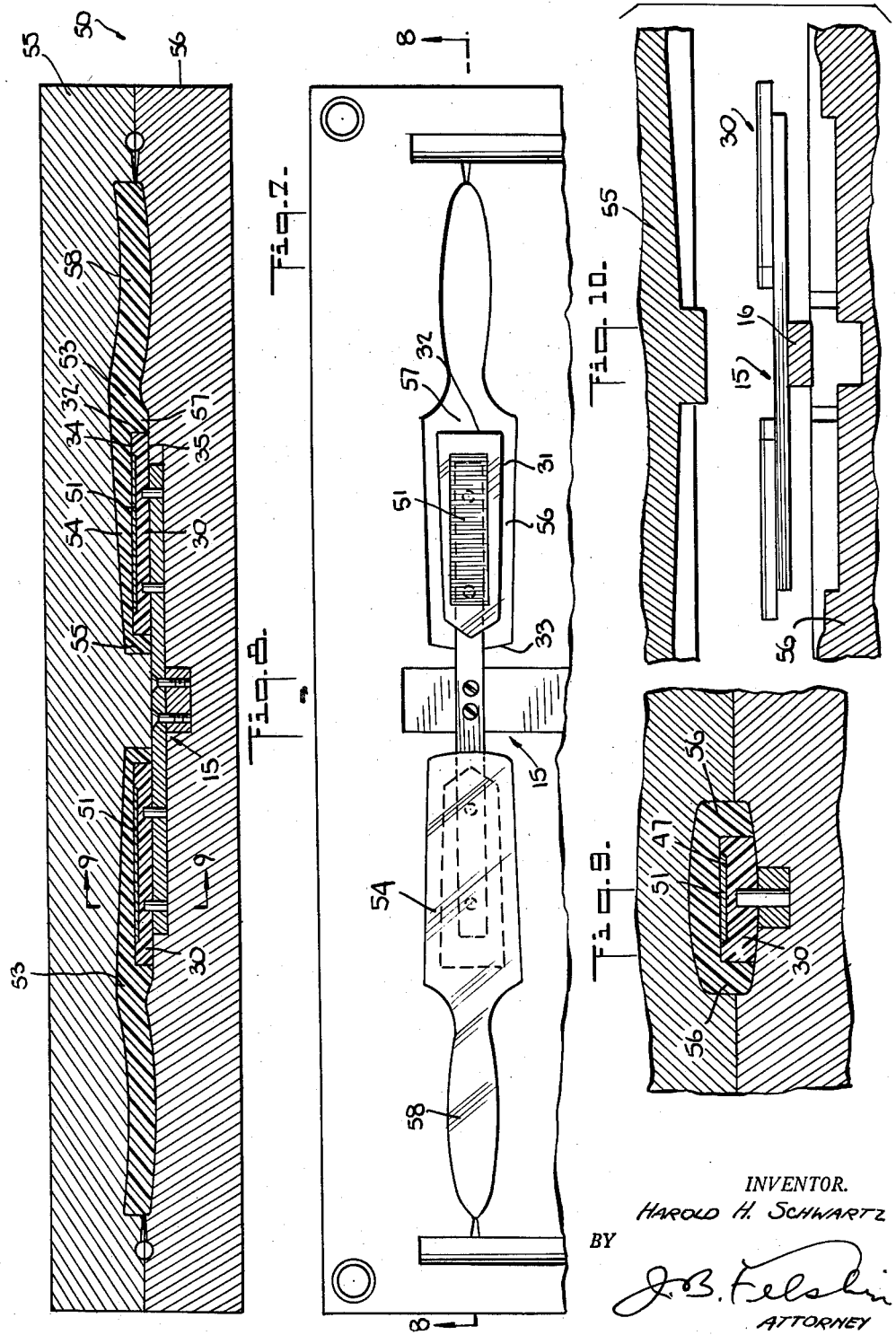

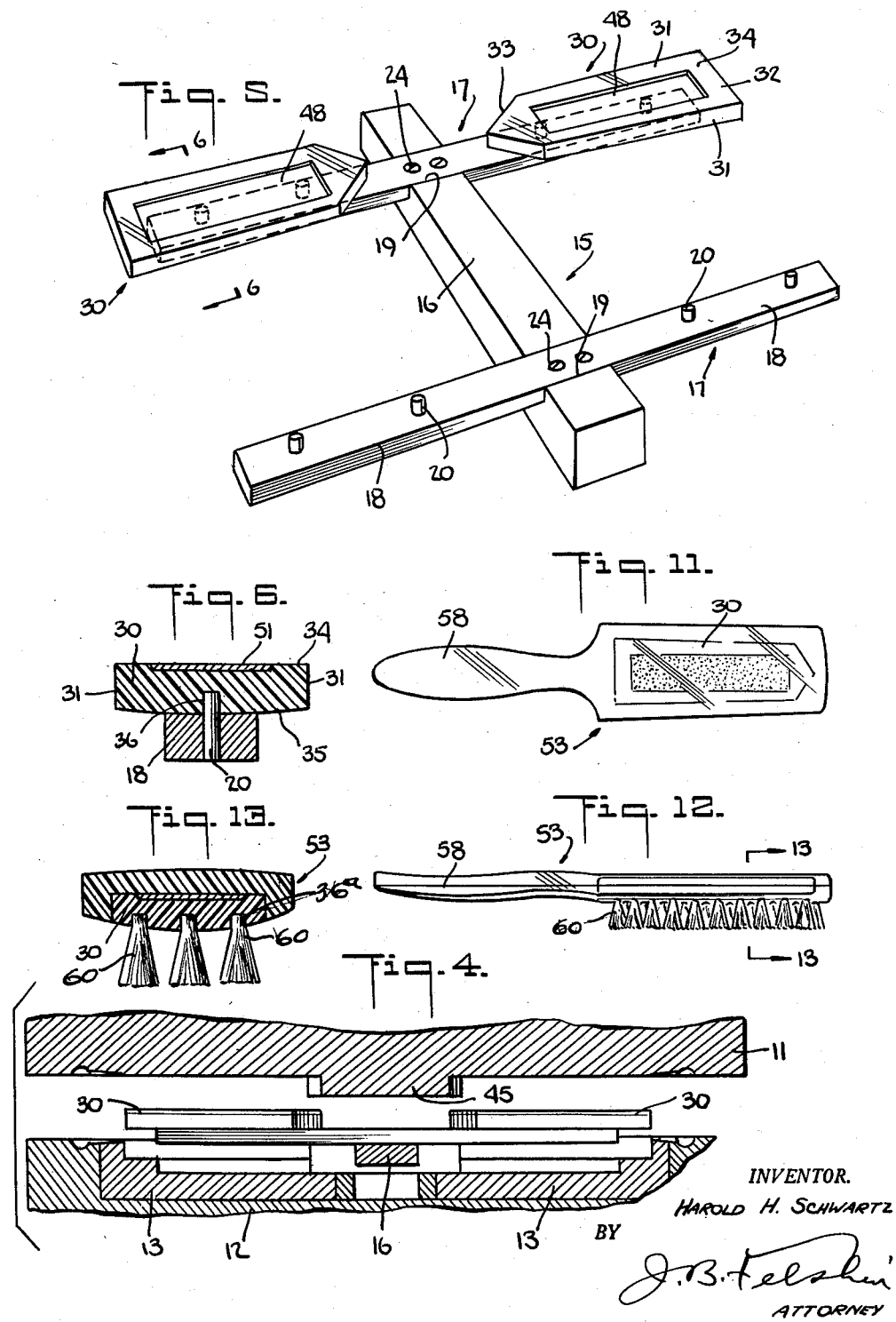

United States Patent Office 2,923,035
Patented Feb. 2, 1960

2,923,035

METHOD FOR MOLDING PLASTIC ARTICLES

Harold H. Schwartz, Port Chester, N.Y., assignor to Empire Brushes, Inc., Port Chester, N.Y., a corporation of New York Application August 3, 1956, Serial No. 601,918

6 Claims. (Cl. 18—59)

This invention relates to method and apparatus for molding plastic articles. It is particularly directed to apparatus for and method of combining two molded plastic parts of different colors into one article.

An object of this invention is to provide a highly improved method of the character described which may be carried out without cracking or breaking of either of the molded parts while insuring against one of the molded parts shifting relative to the other molded part, and at the same time to further insure a good molecular fission between the two parts.

Still another object of this invention is to provide a method of the character described which may be carried out without plastic material of one color flowing around and under the plastic material of another color.

In accordance with the present invention means is provided to accurately position the two plastic parts relative to one another and to prevent thermal shock when the second part is molded to the first part.

Yet a further object of this invention is to provide a method of molding of the character described in which decorative material may be incorporated between the two molded parts so that the decorative material may be entirely covered and yet may be seen through one of said molded parts.

Still a further object of this invention is to provide an improved method of the character described which shall be economical to carry out, which shall produce highly attractive plastic articles, and which shall yet be practical and efficient to a high degree in use.

Other objects of this invention will in part be obvious and in part hereinafter pointed out.

The invention accordingly consist sin the features of construction, combinations of elements, and arrangement of parts, and method steps, which will be exemplified in the construction hereinafter described, and of which the scope of invention will be indicated in the appended claims.

In the accompanying drawings in which is shown various illustrative embodiments of this invention;

Fig. 1 is a top plan view of apparatus embodying the invention for carrying out the first molding operation in accordance with the present invention;

Fig. 2 is a cross-sectional view taken on line 2—2 of Fig. 1;

Fig. 3 is a cross sectional view taken on line 3—3 of Fig. 2;

Fig. 3A is a cross-sectional view taken on line 3A—3A of Fig. 2;

Fig. 4 is an exploded cross-sectional view of the structure shown in Fig. 2;

Fig. 5 is a perspective view of the insert used in Fig. 1 and showing a pair of first mold pieces thereon;

Fig. 6 is a transverse cross-sectional view taken on line 6—6 of Fig. 5 but showing decorative material disposed within the first mold part;

Fig. 7 is a top plan view of the lower mold part illustrating the second molding operation in accordance with the present invention;

Fig. 8 is a cross-sectional view taken through line 8—8 of Fig. 7, but illustrating both mold parts of the mold press used in the second molding operation, and further illustrating the second mold pieces molded to the first mold pieces;

Fig. 9 is a cross-sectional view taken on line 9—9 of Fig. 8;

Fig. 10 is an exploded view of the structure shown in Fig. 8;

Fig. 11 is a top plan view of a brush back formed in accordance with the present invention;

Fig. 12 is a side elevational view of the brush backs, as shown in Fig. 11, with the bristles assembled therewith; and Fig. 13 is a cross-sectional view taken on line 13—13 of Fig. 12.

Referring now in detail to the drawings, 10 designates a mold press used for a first molding operation in accordance with the present invention. The mold press 10 comprises an upper mold 11 and a lower mold 12. In the lower mold 12 are pairs of aligned mold blocks 13 and a central mold block 14. Said mold blocks 13 and 14 are formed with suitable cavities to receive a mold insert 15, shown in perspective view in Fig. 5.

The insert 15 comprises a center bar 16 in which are mounted a pair of parallel cross bars 17. The cross bars 17 have outwardly extending arms 18. The center parts of the cross bars 17 fit in grooves 19 in the center bar 16. Fixed to each arm 18 and extending upwardly therefrom are a pair of spaced, aligned, round pins 20. The mold blocks 13 are formed with grooves 21 to receive the arms 18 of the insert. The center block 14 is formed with a slot 22 to receive the center bar 16 of said insert. The cross bars 17 may be attached to the center bar 16 by screws 24 or in any other suitable manner. The top surface of the bars 17 and 16 are preferably in the same plane. The block 14 may also be formed with suitable cavities 26 through which portions of arms 18 pass. The mold blocks 13 are furthermore formed with cavities C for molding the first mold pieces 30.

Mold piece 30 may be molded on the arms 17. Each mold piece 30 may have side edges 31, an end edge 32, and a V-shaped opposite end edge 33. Each mold piece 30 may have a top surface 34 and an under surface 35. Each mold piece is formed at its underside with a pair of aligned openings 36 which are formed by the pins 20 on the insert 15. The blocks 13 have cavities 40 just above the plane of the top surface of the arms 18 to form the mold pieces 30. The mold pieces 30 when molded, are mounted on the arms 18 and extend longitudinally thereof.

The top mold part 11 fits on to bottom mold part 12 and has surfaces mutually contacting with the upper surface of the mold part 12. The upper surfaces of the blocks 13 are in the plane of the upper surfaces of the mold part 12. The upper surface of the mold part 14 is level with the upper surface of the arms 18. Thus, the upper mold part 11 has central downward projections 45 which extend down to the top surfaces of the central portions of arms 17 between the mold cavities 40.

Thus, when the insert is placed in the lower mold part 12 and the mold part 11 of the first mold press comes down and plastic is poured through the passage 46 and the passages 47, 48, and 49, the mold pieces 30 will be molded in cavities 40.

The upper mold part 11 may be formed with shallow projections 47 projecting into cavities 40 to cause recesses 48 to be formed in the mold pieces 30, if desired. In accordance with the present invention the mold pieces 30 are molded in the first press 10 of opaque plastic material.

In accordance with the present invention after the mold pieces are molded, the press is opened and the insert 15 together with the mold pieces 30 molded thereon, is taken from the first press, and while the mold pieces are still warm, said insert with the mold pieces 30 thereon is placed in the second mold press 50, shown in Figs. 7, 8, 9 and 10 of the drawing. Before that is done, however, decorative material 51 may be inserted into the cavity 47 of each mold piece 30, as illustrated at Figs. 8 and 9 of the drawing. The decorative material may comprise paint, a cameo, metal foil, plastic material of higher melting point, a stamping or any other decorative piece made of any suitable material.

The second mold press 50 comprises an upper mold part 55 and a lower mold part 56 complementary thereto. Said mold parts, when placed together are formed with suitable cavities to receive the insert 15, the first plastic pieces 30, and are further formed with cavities for molding second mold pieces 53. For the purpose of illustration, the plastic piece 53 are shown as backs and handles for brushes. Each plastic piece 53 has a portion 54 overlying the upper surface 34, and the decorative material 51. It also has a portion 55 disposed forwardly of the V edge 33 of the plastic piece 30. It also has portions 56 disposed on opposite sides of the side edges 31 of the plastic piece 30. It also has a portion 57 contacting the rear edge 32 of the plastic piece 30. The handle portion 58 of the plastic piece 53 extends rearwardly of the portion 57. The bottom surfaces of the portions 55, 56 and 57 are coextensive with the under-surface 35 of the plastic piece 30. The plastic pieces 53 may be molded in the second mold press in the usual manner, preferably of clear or transparent plastic so that the decorative material 51 may be seen therethrough.

After the second pieces 58 are molded to the pieces 30, the second mold press 50 may be opened up and then the fused together pieces 30 and 53 may be removed.

It will now be understod that the first mold pieces are molded on a removable metal insert or plate which is inserted into the first mold press. This insert has two pins on each arm to hold each first molded piece. Upon removal of the insert for the first molded pieces, after the first molding operation, the first molded pieces may be stamped with a design or have decorative metal, fabric, or other decorative material inserted into the cavities 47. Then the entire unit, that is, the insert 15 with the first mold pieces 30, are transferred to another press and transparent plastic is molded around the first opaque pieces to form combined articles. The function of the insert with its pins is to securely hold the first mold pieces thereon. The first mold pieces are liable to shrink and if not held securely the flow of the hot plastic material in the second mold press would push the first mold pieces and shift them against the cavity walls. Thus, in the second molding operation, the hot plastic would flow around and under the opaque pieces if not for the pins.

The insert 15 centers the first molded pieces in the correct position relative to the molds for the second molded pieces. The second molding operation should be carried out while the first mold pieces are still warm, because if the first plastic pieces are still warm, the second plastic pieces will stick better to the first mold pieces and there will be no thermal shock. If the first molded pieces were cold at the time the second molding operation takes place, they would be subjected to thermal shock and crack or break.

Before the second mold is closed, the first mold pieces can be sprayed with a fine spray of solvent which will roughen the surfaces of the first mold pieces so that when the second flow of hot plastic meets the first mold pieces, all the crevices will make a good molecular fission. Furthermore, the second mold pieces can be roughened by leaving the walls of the cavity rough instead of smooth or often V cuts may be molded into the first pieces. It is preferable to let the hot plastic in the second mold flow down perpendicular to the top of the mold cavity and the first mold pieces will take the shock with greater ease. The transparent second mold pieces cover the decoration on the first mold piece. The roughened surfaces of the first mold pieces will be smoothed out by the hot second shot.

The openings 36 formed in member 30 may be used as openings into which tufts 60 may be inserted and secured. Additional openings 36a may be drilled in the piece 30 to accommodate the remaining tufts of the brush.

An alternate method is to mold the first pieces with two holes and pull them out as separate units. Then the separate units may be reheated and placed into the second mold without the use of an insert. The second mold, however, should have pins to be received in two holes of each of the first mold pieces to hold them securely in place.

It will thus be seen that there is provided a device, article and process in which the several objects of this invention are achieved, and which is well adapted to meet the conditions of practical use.

As various possible embodiments might be made of the above invention, and as various changes might be made in the embodiments above set forth, it is to be understood that all matter herein set forth, or shown in the accompanying drawings is to be interpreted as illustrative and not in a limiting sense.

Having thus described my invention, I claim as new and desire to secure by Letters Patent:

1. A method, comprising placing a metal insert provided with a pair of pins in a mold cavity having a chamber receiving at least part of the insert to non-movably position the same when the mold is closed, molding an article of plastic material of one color to the insert and around said pins, removing the insert together with the molded article from the mold cavity, placing said insert together with the molded article therein in another mold cavity having a chamber receiving at least part of the insert to non-movably position the same when the mold is closed, and molding plastic of another color in said other mold cavity, to the first plastic molded article, removing the molded article and the insert from said other mold and separating the insert and its associated pins from the article, the pins leaving blind openings in the article adapted for the reception of tufts of bristles.

2. The method of claim 1, the insert and first molded article being placed in the second mold cavity while the first molded article is still warm, and before it has cooled back to room temperature.

3. The method of claim 2, with the further step of roughening the surface of the first molded article.

4. The method of claim 3, the roughening of the surface of the first molded article being accomplished by roughening the first molded article after it is molded by means of a tool.

5. The combination of claim 3, the roughening of the first molded article being accomplished by molding crevices into the surface of the first molded article during the first molding operation.

6. A process, comprising placing a metal insert comprising a flat arm with a pair of pins projecting from a surface thereof in a cavity of first mold press non-movably positioning the same when the mold press is closed, molding a first plastic article within said mold press on said arm and against said surface whereby said pins mold blind openings in said article, removing the insert and the first molded article together from the press placing the same into a cavity of a second mold press having a chamber receiving and non-movably positioning said insert when the second mold press is closed, before the first molded article is cooled to room temperature, and molding in the second mold press, plastic of a different color than the first article, to the first molded article then removing the insert with the molded article from the second mold press and removing the molded article from the insert and its associated pins leaving said blind openings adapted for the reception of tufts of bristles to form a brush.

References Cited in the file of this patent

UNITED STATES PATENTS

| | | |
|---|---|---|
| 345,983 | Miller | July 20, 1886 |
| 1,558,505 | Ray | Oct. 27, 1925 |
| 1,815,234 | Byck et al. | July 21, 1931 |
| 1,827,549 | Villain | Oct. 13, 1931 |
| 1,973,117 | Sklar | Sept. 11, 1934 |
| 2,011,477 | Fischer | Aug. 13, 1935 |
| 2,266,432 | Morin et al. | Dec. 16, 1941 |
| 2,332,376 | Haberberger | Oct. 19, 1943 |
| 2,358,259 | Siedschlag et al. | Sept. 12, 1944 |
| 2,428,977 | Mares | Oct. 14, 1947 |
| 2,434,416 | Kohn et al. | Jan. 13, 1948 |
| 2,492,973 | Dofsen et al. | Jan. 3, 1950 |
| 2,544,140 | Dofsen et al. | Mar. 6, 1951 |
| 2,592,296 | Kutik | Apr. 8, 1952 |
| 2,604,660 | Karns | July 29, 1952 |

FOREIGN PATENTS

| | | |
|---|---|---|
| 606,972 | Great Britain | Aug. 24, 1948 |